Aug. 26, 1941.     P. VAN CLEEF     2,253,922
MANUFACTURE OF TAPE
Filed Oct. 25, 1940

Inventor:-
Paul Van Cleef
By Fred Gerlach
His Atty.

Patented Aug. 26, 1941

2,253,922

UNITED STATES PATENT OFFICE 2,253,922

MANUFACTURE OF TAPE

Paul Van Cleef, Chicago, Ill., assignor to Van Cleef Bros., Chicago, Ill., a partnership consisting of Noah Van Cleef, Felix Van Cleef, Maxime Van Cleef, and Paul Van Cleef Application October 25, 1940, Serial No. 362,783

7 Claims. (Cl. 91—68)

The present invention relates generally to the manufacture of tape. More particularly the invention relates to the manufacture of that type of tape which is merchandised or sold in roll form, is adapted to be used for masking and other purposes, and comprises a long narrow base strip of flexible porous fibrous material having on one face thereof a coating of permanently tacky pressure sensitive rubber base adhesive and embodying on its other or outer face a vulcanized rubber protective coating whereby it is rendered impervious or resistant to paint, lacquer and other finishing materials and also organic solvents and water.

The primary or principal object of the invention is the provision of a tape manufacturing method which comprehends the formation in the base strip of a partial or incomplete vulcanized or cured rubber latex filling which serves as an effective and efficient medium for bonding or anchoring the vulcanized rubber protective coating as well as the coating of permanently tacky pressure sensitive rubber base adhesive to the base strip and in addition serves to increase the stretchability of the tape as a whole without affecting in any appreciable way the setting properties of the tape. In general this method comprises, first, applying to one face of the base strip a protective coating in the form of a thick viscous rubber composition with a solvent and vulcanizing agent for the rubber, then applying heat to the coating to evaporate the solvent, then applying to the other face of the strip an aqueous rubber latex dispersion including a vulcanizing agent for the rubber of the latex, in such manner that it penetrates through the strip to said one face of the strip and forms a bond between the latter and the coating, then directly thereafter applying heat so as to drive off the water of the latex dispersion, then subjecting the strip to a vulcanizing temperature in order to cure or vulcanize the coating and the rubber of the latex, and finally applying a coating of permanently tacky rubber base pressure sensitive adhesive to said other side of the strip. By applying the aqueous rubber latex dispersion to the other face of the base strip after application of the thick viscous rubber composition to the one face and then directly thereafter applying heat so as to drive off the water of the latex dispersion the filling in the base strip after the conclusion of the curing or vulcanizing operation has voids or air pockets in it and it is for this reason that the filling does not interfere to any appreciable extent with the normal setting properties of the tape.

A further object of the invention is the provision of a tape manufacturing method which is simple and has certain advantages over, and is generally an improvement upon, previously designed methods of making or manufacturing tape.

Other objects of the invention and the various advantages and characteristics of the present tape manufacturing method will be apparent from a consideration of the following detailed description.

The invention consists in the hereinafter set forth method and is more particularly defined by claims at the conclusion hereof.

In the drawing which accompanies and forms a component part of this specification or disclosure and in which like numerals of reference denote corresponding parts throughout the several views.

Figure 1:
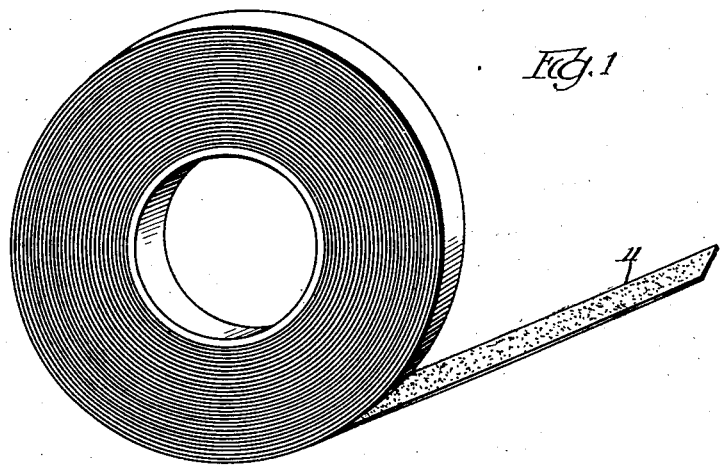
Figure 1 is a perspective of a roll of tape made in accordance with the improved method.
Figure 2:
Figure 2 is an enlarged longitudinal sectional view of the base strip before application of the protective coating to its outer face and prior to being partially filled with rubber latex and equipped with a coating of permanently tacky pressure sensitive rubber base adhesive.
Figure 3:
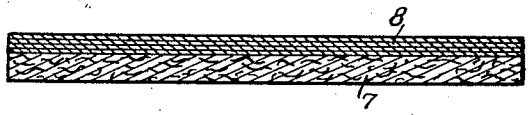
Figure 3 is an enlarged longitudinal sectional view showing the strip after application of the protective coating of rubber to its outer face.
Figure 4:
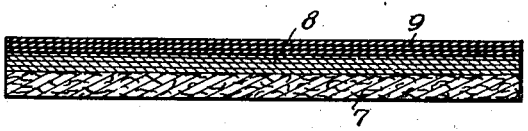
Figure 4 is an enlarged longitudinal sectional view showing the strip after application of a separator coat of ethyl cellulose to the rubber protective coating.
Figure 5:
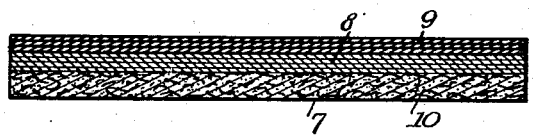
Figure 5 is an enlarged longitudinal sectional view showing the strip after application of the protective coating and the ethyl cellulose separator coat and also after being partially filled with rubber latex.
Figure 6:
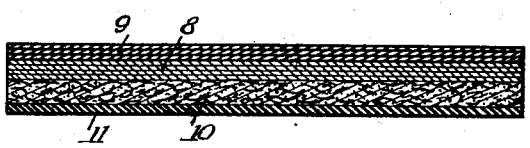
Figure 6 is an enlarged sectional view of the finished tape.

The method which constitutes the invention comprehends the formation of a tape which is useable for masking and other purposes and is adapted to be merchandised or supplied in roll form, as shown in Figure 1. The completed tape, i. e., the tape which is formed by the improved method comprises a long narrow base strip 7, a vulcanized rubber protective coating 8 on the outer face of the strip 7, a separator coat 9 on the outer facing of the protective coating, a rubber latex filling 10 for the base strip and a coating 11 of permanently tacky pressure sensitive rubber base adhesive on the inner face of the base strip.

The base strip 7 is formed of paper, preferably paper of the type which is disclosed in, and forms the subject matter of United States Patent No. 2,045,096, is employed. Such paper is a porous long fibered paper consisting of uncrushed cylindrical soft non-hydrated fibers which are of substantially uniform length and are uniformly distributed to leave minute substantially uniformly spaced openings throughout the area of the paper. By employing such paper as the base strip the tape is characterized by marked flexibility, toughness and stretchability.

The protective coating 8 is applied to the base strip 7 before the coating 11 of pressure sensitive adhesive. It serves to strengthen the base strip and render it impervious or resistant to paint, lacquer and other finishing materials and also oils, organic solvents and water. The coating is applied by spreading on the outer face of the base strip a plurality of coats of a vulcanizable rubber composition which is dissolved in a suitable organic solvent such as naphtha, and is composed of the following ingredients in substantially the proportions specified:

| | Parts by weight |
|---|---|
| Rubber | 35.0 |
| Sulphur | .5 |
| Accelerator | .8 |
| Zinc oxide | 2.0 |
| Reinforcing pigment and fillers | 62.0 |

Preferably four coats of the aforementioned composition are used to form the protective coating 8 and these coats are applied successively and one on top of the other by way of a doctor knife on a spreading machine. After the application of each coat to the base strip 7 heat is applied by way of heated coils behind the doctor knife in order to dry the coat by evaporating or driving off the solvent. The sulphur in the composition serves as a vulcanizing agent whereby the coating 9 upon the application of heat, as hereinafter described, is vulcanized into adhering relation with the base strip. By reason of the fact that the coating 8 includes a comparatively high percentage of reinforcing pigment and fillers it is thick and viscous and penetrates to no appreciable extent into the paper base strip 7. In addition it is fluid impervious when in its uncured form, i. e., directly after application thereof to the outer face of the base strip. Due to the presence of a high percentage of reinforcing pigment and fillers the protective coating 8 after curing and vulcanization is stretchable but at the same time has no appreciable recovery tendencies.

The separator coat 9 extends over and completely covers the protective coating 8 and is applied before vulcanization of the rubber component of said coating. It is composite in character in that it is formed of three thin layers, and forms a smooth glossy finish whereby the coating 11 of pressure sensitive rubber base adhesive is precluded from becoming bonded to the protective coating 8 when the tape is rolled upon itself. Each of the three layers is applied by way of a doctor knife on a spreading machine similarly to the coats which form the protective coating 8. The innermost layer is preferably formed by mixing together the following ingredients in substantially the proportions specified:

| | | |
|---|---|---|
| Ethyl cellulose | pounds | 15 |
| Rubber stock or material like that used to form the protective coating 8 | pounds | 15 |
| Benzol | gallons | 15 |

After application of the innermost layer, heat is applied so as to disperse or evaporate the solvent, i. e., the benzol. The intermediate layer of the coat 9 is applied immediately after drying of the innermost coat. It is preferably formed of the following ingredients in substantially the proportions specified:

| | | |
|---|---|---|
| Ethyl cellulose | pounds | 15 |
| Rubber stock or material which is used to form the coating 8 | pounds | 5 |
| Benzol | gallons | 15 |

After application of the intermediate layer the solvent is evaporated by way of heat. The third or outermost coat forming layer is applied after drying of the intermediate or second coat and preferably consists of the following ingredients in substantially the proportions specified:

| | | |
|---|---|---|
| Ethyl cellulose | pounds | 20 |
| Benzol | gallons | 20 |
| Resin | pound | 1 |

After application of the outermost layer heat is applied so as to disperse the benzol and thus dry the layer. By having a comparatively large amount of rubber stock in the innermost layer and a small amount of rubber stock in the intermediate layer, the coat 9 is of such consistency or character that it readily unites or bonds itself to the outer coat of the protective coating 8 and there is substantially no likelihood of the coating 9 being stripped from the protective coating by adhesion to the pressure sensitive rubber base coating 11 when the tape is unwound. By having the outermost layer formed substantially entirely of ethyl cellulose the coating of pressure sensitive rubber base adhesive on the inner face of the paper strip 7 strips or pulls away readily when the tape is unwound and bonding of the coating 11 of pressure sensitive adhesive to the protective coating 8 is effectively eliminated. The innermost and intermediate layers of the coat 9 constitute anchor layers between the outer layer and the outer coat of the protective coating 8. A small amount of resin is used in the third or outermost coat in order effectively to bond such coat to the intermediate coat and prevent it from being torn or pulled away with the coating 11 when the tape is unrolled. As a resin, rosin, ester gum, paracoumarone or burgundy pitch may be used. By employing ethyl cellulose the coat is heat resistant, and is also free from discoloration by sunlight. In addition it is soluble in cheap or inexpensive solvents and eliminates tackiness as far as the top surface of the tape is concerned.

The rubber latex filling 10 serves to increase the stretchability of the base strip and also to bond the protective and adhesive coatings to the strip. It is formed of the following ingredients in substantially the proportions specified:

| | Parts by weight |
|---|---|
| 60% ammoniated rubber latex | 100.0 |
| Sulphur | 1.0 |
| Zinc oxide | 2.0 |
| Antioxidant | 0.5 |
| Accelerator | 1.25 |
| Wetting agent | 0.5 |

The sulphur, zinc oxide, and antioxidant are preferably first ground in a pebble mill and are then stirred or mixed into commingling relation with the ammoniated rubber latex. The rubber latex is preferably reduced in concentration to 55%. The solution, that is, the liquid or aqueous rubber latex dispersion is applied to the inner face of the base strip 7 in such manner that it comes in contact with the inner coat of the protective coating 8. Preferably the liquid latex composition is applied by way of squeeze rolls so that it penetrates the strip and produces a bond between the outer face of the strip and the protective coating. After application of the composition in the aforementioned manner to the base strip, the strip with its protective coating 8 and coat 9 on one side and its filling of rubber latex composition is passed over steam coils or through a hot air chamber so as to dry the filling by dissipating the solvent for the latex, that is, the water part of the composition. Upon drying of the filling 10 there is a substantially permanent bond between the protective coating 8 and the base strip 7. The liquid latex composition is preferably applied and dried directly after drying of the outer layer of the coat 9. By reason of the fact that the rubber latex composition or dispersion is applied to the inner face of the paper base strip 7 after application of the fluid impervious protective coating 8 a certain amount of air in the interstices between the fibers of the paper base strip is trapped or locked in place and hence the filling has many voids or air pockets throughout and is essentially a partial or incomplete filling. Because of the voids or air pockets in the filling the setting properties of the tape as a whole is not affected, and hence when the tape is stretched or applied in a curved manner in connection with masking work there is no tendency of the tape to spring back to its original or normal length. The void or air pocket structure of the filling is further augmented when the water part of the aqueous rubber latex dispersion is driven off by the heating step which immediately follows application of the dispersion to the inner face of the paper base strip 7. Whereas the filling 10 is a partial or incomplete filling it serves its intended purpose in that it provides an efficient medium for bonding the protective and adhesive coatings to the base strip.

After drying of the rubber latex filling 10, that is, after dissipation of the water, the base strip with its protective coating 8 and the ethyl cellulose coat 9 is placed in a heater or oven and subjected to a temperature of approximately 250° F. in order to vulcanize the rubber of the protective coating and also the rubber latex filling 10. The strip is left in the heater or oven for a sufficient period of time to effect complete vulcanization or curing of the coating 8 and the filling. At the conclusion of the vulcanizing operation there is a substantially permanent bond between the rubber latex filled base strip and the protective coating 8. With such a bond there is no likelihood of the protective coating 8 being stripped from the paper base strip during unwinding of the tape.

The coating 11 serves as an anchoring or sticking medium for holding the tape against any surface to which it is applied, and is preferably made in accordance with the following formula:

| | Parts by weight |
|---|---|
| Rubber | 36.0 |
| Zinc oxide | 26.0 |
| Adhesive resins and softeners | 28.0 |
| Fillers | 10.0 |

The adhesive coating is preferably applied by a calendering machine after vulcanization of the coating 8 and during application becomes bonded to the inner face of the paper base strip. The portion of the rubber filling 10 which is on the inner face of the base strip serves to augment the normal or natural bond between the pressure sensitive coating 11 and the strip. By reason of the fact that the adhesive coating 11 is permanently tacky and pressure sensitive the tape may be applied to any surface by way of pressure and readily removed and used again, if so desired.

The herein described method of tape manufacture is a comparatively simple one and comprises as its main steps: (1) Application of the rubber protective coating 8 to the outer face of the base strip; (2) application of the ethyl cellulose coat 9 to the outermost coat of the protective coating 8; (3) filling of the paper base strip 7 with rubber latex; (4) vulcanization of the rubber protective coating 8 and the filling 10; and (5) application to the inner face of the cured latex filled paper base strip 7 of the coating 11 of permanently tacky pressure sensitive rubber base adhesive. The sequence of steps constitutes the essence of the invention in that it results in a rubber latex filling which is so interspersed with voids or air pockets that it in no way affects the normal setting properties of the tape as a whole.

The invention is not to be understood as being restricted to the specific details set forth, since these may be modified within the scope of the appended claims without departing from the spirit and scope of the invention.

This application is a continuation in part of application for United States Letters Patent filed by me on July 24, 1937, Serial No. 155,483 (Patent No. 2,229,316, dated January 21, 1941).

Having thus described the invention, what I claim as new and desire to secure by Letters Patent is:

1. That improvement in the manufacture of tape which comprises first applying to one face of a thin strip of flexible stretchable porous fibrous material a protective coating in the form of a thick viscous rubber composition with a solvent and vulcanizing agent for the rubber, then applying to the other face of the strip an aqueous rubber latex dispersion including a vulcanizing agent for the rubber of the latex, in such manner that it penetrates through the strip to said one face of the strip and forms a bond between the latter and the coating, then subjecting the strip to a vulcanizing temperature in order to cure or vulcanize the coating and the rubber of the latex, and finally applying a coating of permanently tacky pressure sensitive adhesive to said other side of the strip.

2. That improvement in the manufacture of tape which comprises applying to one face of a strip of stretchable porous paper a protective coating in the form of a thick viscous rubber composition with a solvent and vulcanizing agent for the rubber, then applying to the other face of the strip an aqueous rubber latex dispersion including a vulcanizing agent for the rubber of the latex, in such manner that it penetrates through the strip to the said one face of the strip and forms a bond between the latter and the coating, then subjecting the strip to a vulcanizing temperature for a sufficient period of time to cure or vulcanize the coating and the rubber of the latex, and finally applying a coating of permanently tacky pressure sensitive rubber base adhesive to said other side of the strip.

3. That improvement in the manufacture of tape which comprises applying to one face of a thin strip of flexible stretchable porous fibrous material a plurality of coats of thick viscous rubber composition having a solvent and vulcanizing agent for the rubber and in addition a comparatively high percentage of filler material, then applying to the other face of the strip an aqueous rubber latex dispersion including a vulcanizing agent for the rubber of the latex, in such manner that it penetrates through the strip to the said one face of the strip and forms a bond between the latter and the innermost coat, then subjecting the strip to a vulcanizing temperature for a sufficient period of time to cure or vulcanize the coats and the rubber of the latex, and finally applying a coating of permanently tacky pressure sensitive adhesive to said other face of the strip.

4. That improvement in the manufacture of tape which comprises first applying to one face of a thin strip of flexible stretchable porous fibrous material a protective coating in the form of a thick viscous rubber composition with a solvent and vulcanizing agent for the rubber, then applying heat to the coating to evaporate the solvent, then applying to the other face of the strip an aqueous rubber latex dispersion including a vulcanizing agent for the rubber of the latex, in such manner that it penetrates through the strip to said one face of the strip and forms a bond between the latter and the coating, then directly thereafter applying heat so as to drive off the water of the latex dispersion, then subjecting the strip to a vulcanizing temperature in order to cure or vulcanize the coating and the rubber of the latex, and finally applying a coating of permanently tacky rubber base pressure sensitive adhesive to said other side of the strip.

5. That improvement in the manufacture of tape which comprises first applying to one face of a thin strip of flexible stretchable porous paper a plurality of coats of a thick viscous rubber composition with a solvent and vulcanizing agent for the rubber, and in addition a comparatively high percentage of filler material, then applying to the other face of the strip an aqueous rubber latex dispersion including a vulcanizing agent for the rubber of the latex, in such manner that it penetrates through the strip to said one face of the strip and forms a bond between the latter and the innermost coat, then directly thereafter applying heat so as to drive off the water of the latex dispersion, then subjecting the strip to a vulcanizing temperature in order to cure or vulcanize the coats and the rubber of the latex, and finally applying a coat of permanently tacky pressure sensitive rubber base adhesive to the other side of the strip.

6. That improvement in the manufacture of tape which comprises first applying to one face of a strip of flexible stretchable porous fibrous material a protective coating in the form of a thick viscous rubber composition with a solvent and vulcanizing agent for the rubber, then applying heat to evaporate or drive off the solvent for the coating, then applying to the outer face of the protective coating a coat of liquid compound material including ethyl cellulose with a solvent for the latter, then evaporating the solvent for the ethyl cellulose, then subjecting the strip to a vulcanizing temperature in order to vulcanize said coating, and finally applying a coating of permanently tacky pressure sensitive adhesive to the other side of the strip.

7. That improvement in the manufacture of tape which comprises first applying to one face of a thin strip of stretchable porous paper a protective coating in the form of a thick viscous rubber composition with a solvent and vulcanizing agent for the rubber, then applying heat to evaporate or drive off the solvent from the coating, then applying to the outer face of the protective coating a coat of liquid compound material including ethyl cellulose with a solvent for the latter, then applying heat to evaporate the solvent for the ethyl cellulose, then applying to the other face of the strip an aqueous rubber latex dispersion including a vulcanizing agent for the rubber of the latex, in such manner that it penetrates through the strip to said one face of the strip and forms a bond between the latter and the coating, then applying heat so as to drive off the water of the latex dispersion, then subjecting the strip to a vulcanizing temperature in order to cure or vulcanize the coating and the rubber of the latex, and finally applying a coating of permanently tacky pressure sensitive rubber base adhesive to said other side of the strip.

PAUL VAN CLEEF.